US012801289B2

(12) United States Patent
Zhong et al.

(10) Patent No.: US 12,801,289 B2
(45) Date of Patent: Nov. 17, 2026

(54) DATA WRITING METHOD, MEMORY STORAGE DEVICE AND MEMORY CONTROL CIRCUIT UNIT

(71) Applicant: Hefei Core Storage Electronic Limited, Anhui (CN)

(72) Inventors: Wei Zhong, Anhui (CN); Kai-Di Zhu, Anhui (CN); Zhi Wang, Anhui (CN); Xiaoyang Zhang, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 18/299,053

(22) Filed: Apr. 12, 2023

(65) Prior Publication Data

US 2024/0289029 A1 Aug. 29, 2024

(30) Foreign Application Priority Data

Feb. 24, 2023 (CN) ......................... 202310184408.8

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS 8,301,826 B2 10/2012 Gonzalez et al.
2010/0077158 A1* 3/2010 Asano ..................... G06F 3/067 711/E12.006
2011/0016287 A1* 1/2011 Acedo ................... G06F 3/0689 711/E12.001
2013/0080703 A1* 3/2013 Kumagai .............. G06F 9/5072 711/E12.002

(Continued)

FOREIGN PATENT DOCUMENTS

CN 108694128 10/2018
CN 112486417 3/2021

(Continued)

OTHER PUBLICATIONS

"Office Action of Taiwan Counterpart Application", issued on Sep. 28, 2023, p. 1-p. 7.

(Continued)

*Primary Examiner* — Jared I Rutz
*Assistant Examiner* — Alexander J Yoon
(74) *Attorney, Agent, or Firm* — JCIPRNET

(57) ABSTRACT

A data writing method, a memory storage device, and a memory control circuit unit are disclosed. The method includes the following. A write command is received from a host system. The write command instructs storing of first data belonging to a first logical unit. In response to the first data being first type data, the first data is stored in a first type physical unit according to the write command and first count information corresponding to a first logical range is updated. The first logical unit belongs to the first logical range. In response to the first count information meeting a preset condition, the first data is moved from the first type physical unit to a second type physical unit.

21 Claims, 9 Drawing Sheets

(56) References Cited

U.S. PATENT DOCUMENTS

| | | | | |
|---|---|---|---|---|
| 2013/0311739 | A1* | 11/2013 | Kawakami | G06F 3/0608<br>711/E12.002 |
| 2013/0326183 | A1* | 12/2013 | Bavishi | G06F 3/0605<br>711/165 |
| 2018/0293014 | A1* | 10/2018 | Ravimohan | G06F 3/061 |
| 2019/0042106 | A1* | 2/2019 | Klein | G06F 3/0688 |
| 2019/0187900 | A1* | 6/2019 | Byun | G06F 3/061 |
| 2020/0225863 | A1* | 7/2020 | Veluswamy | G06F 3/0647 |
| 2021/0255803 | A1* | 8/2021 | Kanno | G06F 3/061 |
| 2022/0057952 | A1* | 2/2022 | Bueb | G06F 3/0659 |
| 2022/0083245 | A1* | 3/2022 | Kant | G06F 3/0632 |

FOREIGN PATENT DOCUMENTS

| | | |
|---|---|---|
| CN | 114761931 | 7/2022 |
| TW | 201727492 | 8/2017 |
| TW | 202024919 | 7/2020 |
| TW | 202105185 | 2/2021 |

OTHER PUBLICATIONS

"Office Action of China Counterpart Application", issued on Sep. 23, 2025, p. 1-p. 14.

* cited by examiner

91

| Index value | Count value |
|---|---|
| R1 | C1 |
| R2 | C2 |
| ⋮ | ⋮ |

FIG. 9

DATA WRITING METHOD, MEMORY STORAGE DEVICE AND MEMORY CONTROL CIRCUIT UNIT

CROSS-REFERENCE TO RELATED APPLICATION

This application claims the priority benefit of Chinese application no. 202310184408.8, filed on Feb. 24, 2023. The entirety of the above-mentioned patent application is hereby incorporated by reference herein and made a part of this specification.

BACKGROUND

Technical Field

The disclosure relates to a memory management technology. In particular, the disclosure relates to a data writing method, a memory storage device, and a memory control circuit unit.

Description of Related Art

Mobile phones, tablet computers, and notebook computers have grown rapidly in the past few years, which has led to a rapid increase in consumer demands for storage media. Since a rewritable non-volatile memory module (e.g., flash memory) has properties of non-volatile data, power saving, small size, and non-mechanical structure, it is thus well suitable for being built into the above-mentioned examples of portable electronic devices.

Some types of memory storage devices support a data splitting mechanism to write single pieces of write data with different data amounts into corresponding memory blocks. For example, data whose data amount is less than a predetermined data amount is written into a small data block, and data whose data amount is not less than the predetermined data amount is written into a large data block. Although this data splitting mechanism may improve data writing efficiency, it is also likely to scatteredly store continuous data to discontinuous physical addresses, accordingly leading to troubles in subsequent management.

SUMMARY

The disclosure provides a data writing method, a memory storage device, and a memory control circuit unit, in which data writing efficiency and writing continuity may be achieved.

An exemplary embodiment of the disclosure provides a data writing method for a rewritable non-volatile memory module. The rewritable non-volatile memory module includes a plurality of physical units. The data writing method includes the following. A write command is received from a host system. The write command instructs storing of first data belonging to a first logical unit. In response to the first data being first type data, the first data is stored in a first type physical unit among the plurality of physical units according to the write command and first count information corresponding to a first logical range is updated. The first logical unit belongs to the first logical range. In response to the first count information meeting a preset condition, the first data is moved from the first type physical unit to a second type physical unit among the plurality of physical units.

An exemplary embodiment of the disclosure also provides a memory storage device. The memory storage device includes a connection interface unit for coupling to a host system, a rewritable non-volatile memory module, and a memory control circuit unit. The rewritable non-volatile memory module comprises a plurality of physical units. The memory control circuit unit is coupled to the connection interface unit and the rewritable non-volatile memory module. The memory control circuit unit is configured to: receive a write command from the host system, the where write command instructs storing of first data belonging to a first logical unit; in response to the first data being first type data, store the first data in a first type physical unit among the plurality of physical units according to the write command and update first count information corresponding to a first logical range, where the first logical unit belongs to the first logical range; and in response to the first count information meeting a preset condition, move the first data from the first type physical unit to a second type physical unit among the plurality of physical units.

An exemplary embodiment of the disclosure also provides a memory control circuit unit configured to control a rewritable non-volatile memory module. The rewritable non-volatile memory module includes a plurality of physical units. The memory control circuit unit includes a host interface for coupling to a host system, a memory interface for coupling to the rewritable non-volatile memory module, and a memory management circuit. The memory management circuit is coupled to the host interface and the memory interface. The memory management circuit is configured to: receive a write command from the host system, where the write command instructs storing of first data belonging to a first logical unit; in response to the first data being first type data, store the first data in a first type physical unit among the plurality of physical units according to the write command and update first count information corresponding to a first logical range, where the first logical unit belongs to the first logical range; and in response to the first count information meeting a preset condition, move the first data from the first type physical unit to a second type physical unit among the plurality of physical units.

Based on the foregoing, after receiving the write command instructing storing of the first data belonging to the first logical unit from the host system, in response to the first data being the first type data, the first data may be stored in the first type physical unit, and the first count information corresponding to the first logical range may be updated. Afterward, in response to the first count information meeting a preset condition, the first data may be moved from the first type physical unit to the second type physical unit. Accordingly, data writing efficiency and writing continuity may be effectively achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 9 is a schematic diagram showing a count table according to an exemplary embodiment of the disclosure.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system for the host system to write data into the memory storage device or read data from the memory storage device.

Figure 1:
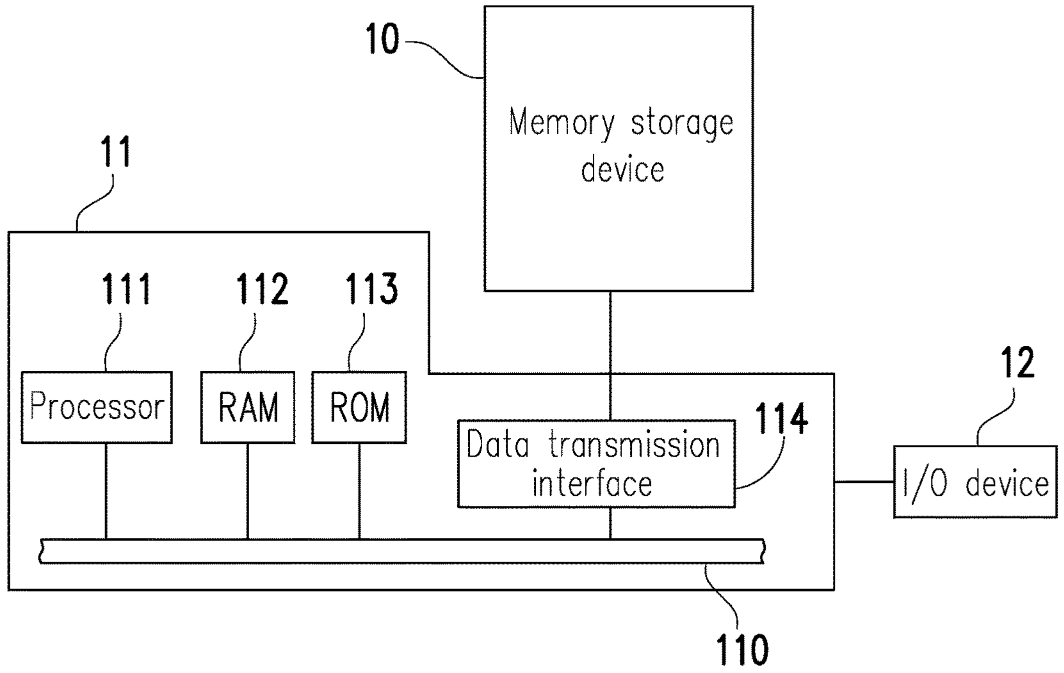
FIG. 1 is a schematic diagram showing a host system, a memory storage device, and an input/output (I/O) device according to an exemplary embodiment of the disclosure.
Figure 2:
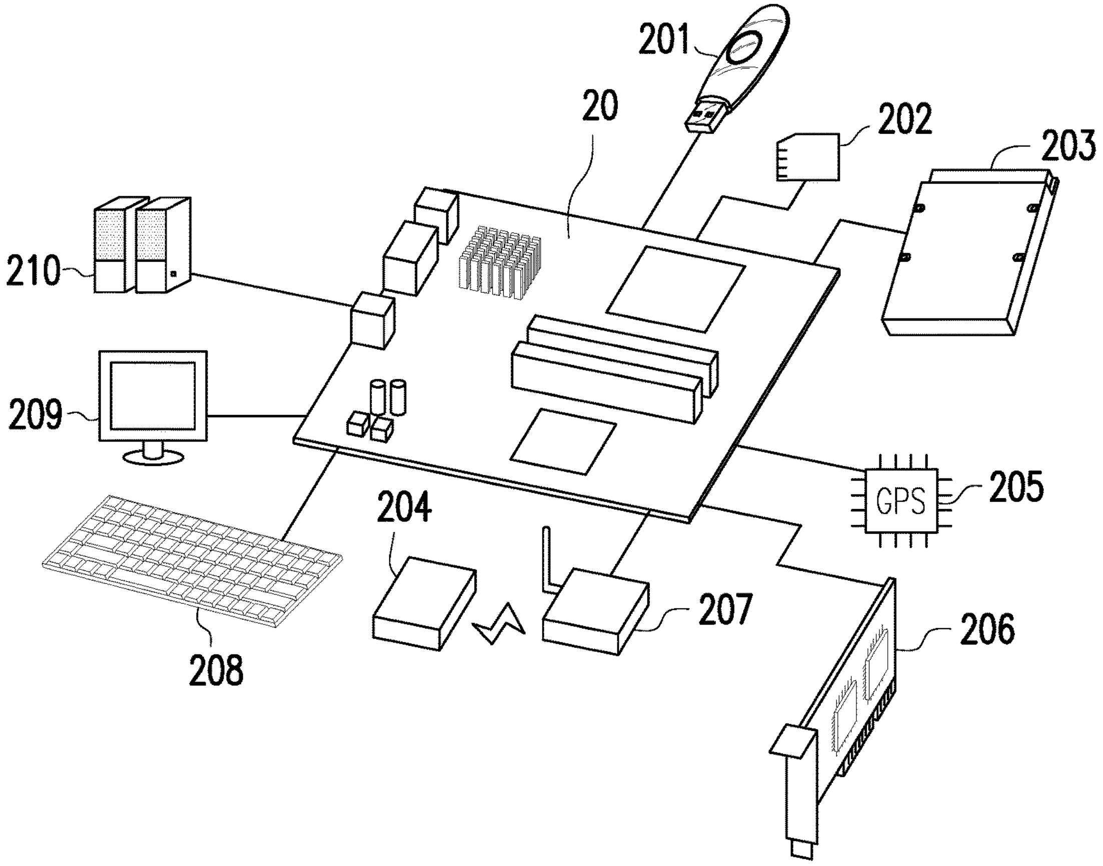
FIG. 2 is a schematic diagram showing a host system, a memory storage device, and an I/O device according to an exemplary embodiment of the disclosure.

FIG. 1 is a schematic diagram showing a host system, a memory storage device, and an input/output (I/O) device according to an exemplary embodiment of the disclosure. FIG. 2 is a schematic diagram showing a host system, a memory storage device, and an I/O device according to an exemplary embodiment of the disclosure.

With reference to FIG. 1 and FIG. 2, a host system 11 may include a processor 111, random access memory (RAM) 112, read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transmission interface 114. For example, the host system 11 may store data into the memory storage device 10 or read data from the memory storage device 10 through the data transmission interface 114. In addition, the host system 11 may be coupled to an I/O device 12 through the system bus 110. For example, the host system 11 may transmit an output signal to the I/O device 12 or receive an input signal from the I/O device 12 through the system bus 110.

In an exemplary embodiment, the processor 111, the random access memory 112, the read only memory 113, and the data transmission interface 114 may be disposed on a motherboard 20 of the host system 11. The data transmission interface 114 may include one or more data transmission interfaces. Through the data transmission interface 114, the motherboard 20 may be coupled to the memory storage device 10 in a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near-field communication (NFC) memory storage device, a Wireless Fidelity (WiFi) memory storage device, a Bluetooth memory storage device, a Bluetooth Low Energy memory storage device (e.g., iBeacon), or any other memory storage device based on various modes of wireless communication technology. In addition, the motherboard 20 may also be coupled to various I/O devices such as a Global Positioning System (GPS) module 205, a network interface card 206, a wireless transmission device 207, a keyboard 208, a screen 209, or a speaker 210 through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that substantially works with a memory storage device to store data. In an exemplary embodiment, the memory storage device 10 and the host system 11 may respectively include a memory storage device 30 and a host system 31 in FIG. 3.

Figure 3:
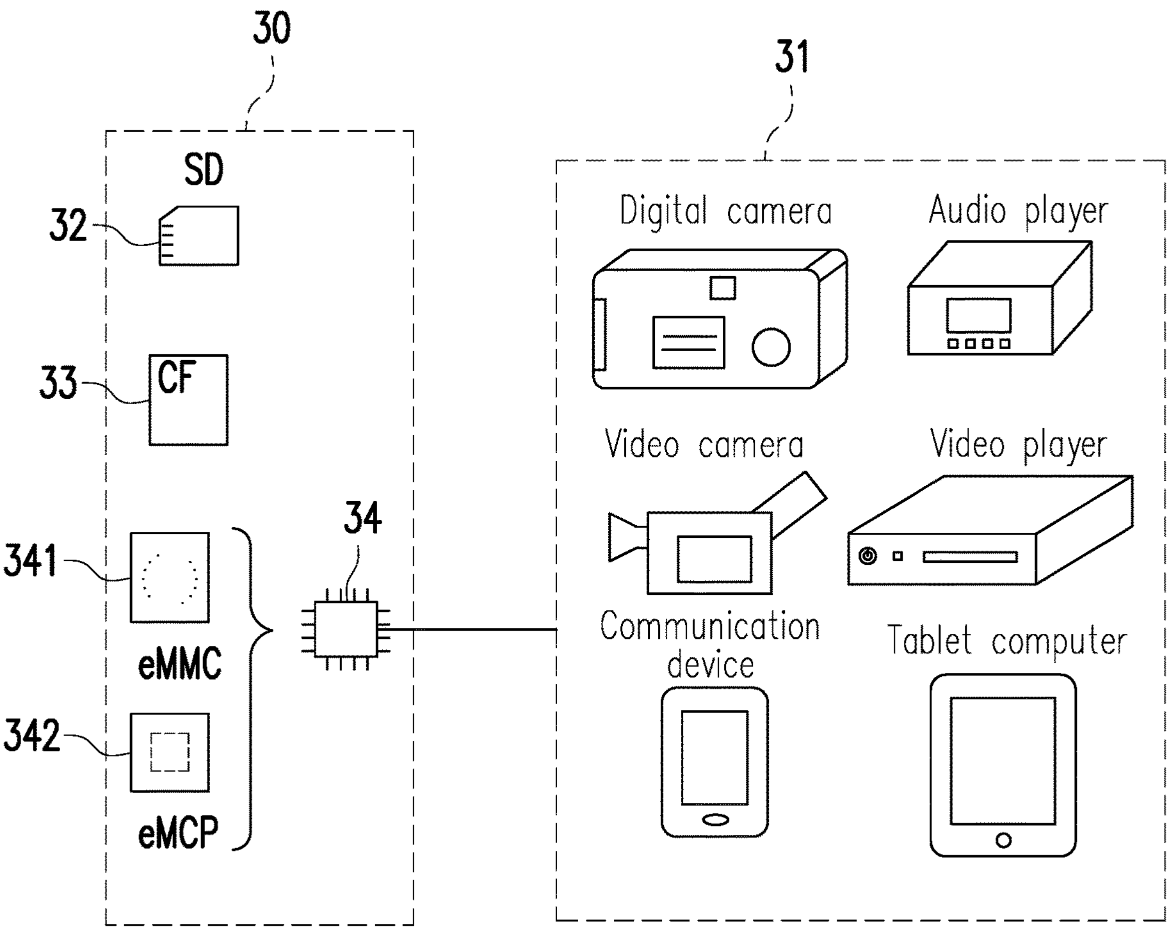
FIG. 3 is a schematic diagram showing a host system and a memory storage device according to an exemplary embodiment of the disclosure.

FIG. 3 is a schematic diagram showing a host system and a memory storage device according to an exemplary embodiment of the disclosure. With reference to FIG. 3, the memory storage device 30 may be used with the host system 31 to store data. For example, the host system 31 may be a system such as a digital camera, a video camera, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes embedded storage devices in various forms, such as an embedded Multi Media Card (eMMC) 341 and/or an embedded Multi Chip Package (eMCP) storage device 342, which directly couple the memory module to the substrate of the host system.

Figure 4:
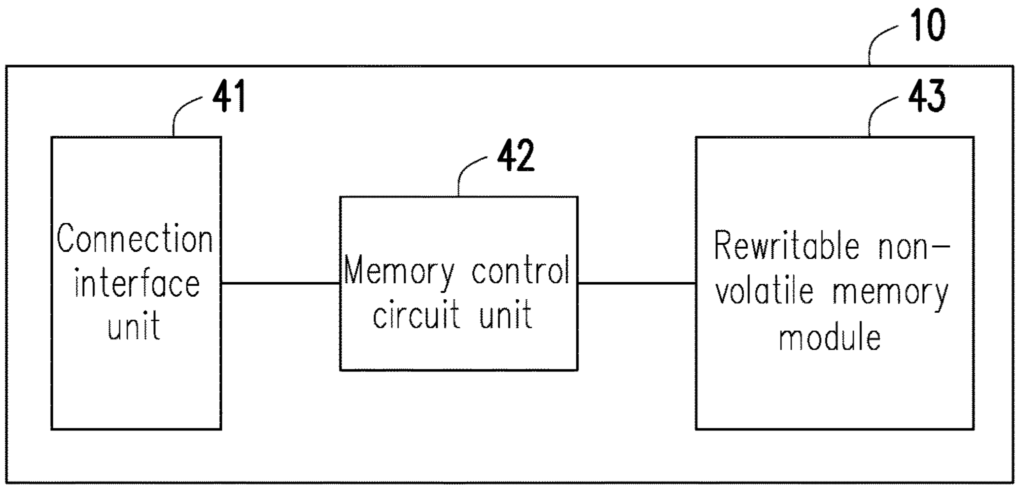
FIG. 4 is a schematic diagram showing a memory storage device according to an exemplary embodiment of the disclosure.

FIG. 4 is a schematic diagram showing a memory storage device according to an exemplary embodiment of the disclosure. With reference to FIG. 4, the memory storage device 10 includes a connection interface unit 41, a memory control circuit unit 42, and a rewritable non-volatile memory module 43.

The connection interface unit 41 is configured to couple the memory storage device 10 with the host system 11. The memory storage device 10 may communicate with the host system 11 through the connection interface unit 41. In an exemplary embodiment, the connection interface unit 41 is compatible with Peripheral Component Interconnect Express (PCI Express). In an exemplary embodiment, the connection interface unit 41 may also be compatible with the Serial Advanced Technology Attachment (SATA) standard, Parallel Advanced Technology Attachment (PATA) standard, Institute of Electrical and Electronic Engineers (IEEE) 1394 standard, Universal Serial Bus (USB) Standard, SD interface standard, Ultra High Speed-I (UHS-I) interface standard, Ultra High Speed-II (UHS-II) interface standard, Memory Stick (MS) interface standard, MCP interface standard, MMC interface standard, eMMC Interface standard, Universal Flash Storage (UFS) interface standard, eMCP interface standard, CF interface standard, Integrated Device Electronics (IDE) standard, or other suitable standards. The connection interface unit 41 may be packaged into the same chip with the memory control circuit unit 42. Alternatively, the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute a plurality of logic gates or control instructions implemented in a hardware form or firmware form and performs operations such as writing, reading, and erasing data in the rewritable non-volatile memory module 43 according to instructions of the host system 11.

The rewritable non-volatile memory module 43 is configured to store data written by the host system 11. The rewritable non-volatile memory module 43 may include a single-level cell (SLC) NAND-type flash memory module (i.e., a flash memory module that stores 1 bit in one memory cell), a multi-level cell (MLC) NAND-type flash memory module (i.e., a flash memory module that stores 2 bits in one memory cell), a triple-level cell (TLC) NAND-type flash memory module (i.e., a flash memory module that stores 3 bits in one memory cell), a quad-level cell (QLC) NAND-type flash memory module (i.e., a flash memory module that stores 4 bits in one memory cell), other flash memory modules, or other memory modules with the same properties.

In the rewritable non-volatile memory module 43, each memory cell stores one or more bits by a voltage change (hereinafter also referred to as a threshold voltage). Specifically, in each memory cell, an electric charge trapping layer is present between a control gate and a channel. By applying a write voltage to the control gate, the amount of electrons in the electric charge trapping layer may be changed, further changing the threshold voltage of the memory cell. This operation of changing the threshold voltage of the memory cell is also referred to as "writing data into the memory cell" or "programming the memory cell". As the threshold voltage changes, each memory cell in the rewritable non-volatile memory module 43 may be in a plurality of storage states. By applying a read voltage, the storage state to which a memory cell belongs may determined, thereby obtaining one or more bits stored in the memory cell.

In an exemplary embodiment, the memory cells of the rewritable non-volatile memory module 43 may constitute a plurality of physical programming units, and the physical programming units may constitute a plurality of physical erasing units. Specifically, the memory cells on the same word line may form one or more physical programming units. If each memory cell stores more than 2 bits, the physical programming units on the same word line may be at least classified into a lower physical programming unit and an upper physical programming unit. For example, the least significant bit (LSB) of a memory cell belongs to the lower physical programming unit, and the most significant bit (MSB) of a memory cell belongs to the upper physical programming unit. Generally speaking, in MLC NAND-type flash memory, the write speed of the lower physical programming unit is greater than the write speed of the upper physical programming unit, and/or the reliability of the lower physical programming unit is higher than the reliability of the upper physical programming unit.

In an exemplary embodiment, the physical programming units are the minimum unit for programming. That is, the physical programming units are the minimum unit for data write. For example, the physical programming units may include a physical page or a physical sector. If the physical programming units are physical pages, the physical programming units may include a data bit region and a redundancy bit region. The data bit region includes a plurality of physical sectors configured to store user data, and the redundancy bit region is configured to store system data (e.g., error correcting codes or other management data). In an exemplary embodiment, the data bit region includes 32 physical sectors, and the size of a physical sector is 512 bytes (B). However, in other exemplary embodiments, the data bit region may also include 8, 16, or more or less physical sectors, and the size of each physical sector may also be greater or smaller. On the other hand, the physical erasing units are the minimum unit of erase. That is, each physical erasing unit includes the minimum number of memory cells that are erased together. For example, the physical erasing units include a physical block.

Figure 5:
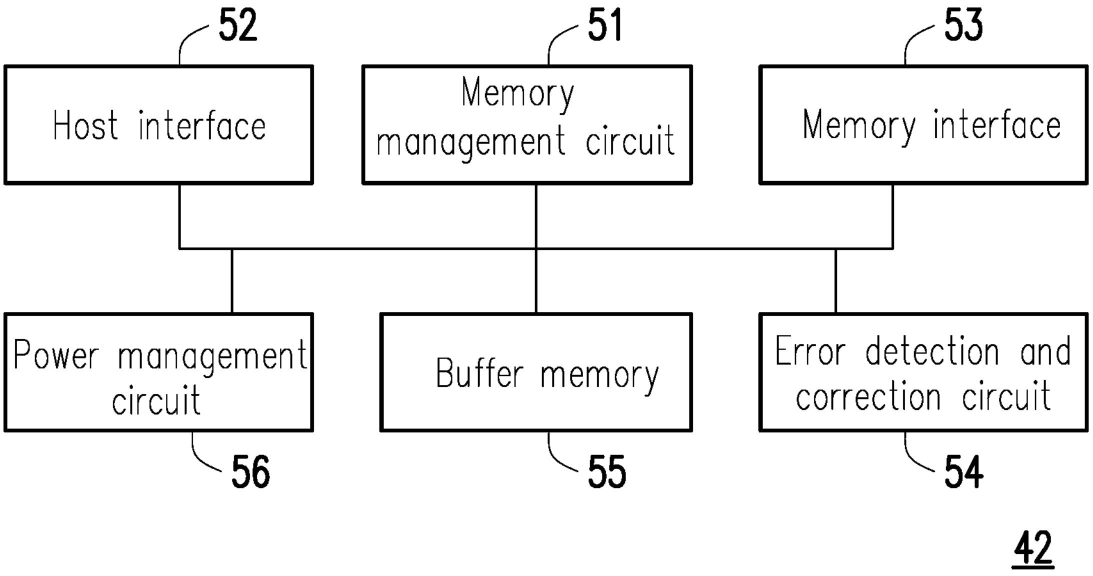
FIG. 5 is a schematic diagram showing a memory control circuit unit according to an exemplary embodiment of the disclosure.

FIG. 5 is a schematic diagram showing a memory control circuit unit according to an exemplary embodiment of the disclosure. With reference to FIG. 5, the memory control circuit unit 42 includes a memory management circuit 51, a host interface 52, and a memory interface 53.

The memory management circuit 51 is configured to control the overall operation of the memory control circuit unit 42. Specifically, there exist a plurality of control instructions in the memory management circuit 51. During operation of the memory storage device 10, the control instructions are executed to perform operations such as writing, reading, and erasing data. Hereinafter, when the operation of the memory management circuit 51 is descried, the operation of the memory control circuit unit 42 is equivalently described.

In an exemplary embodiment, the control instructions of the memory management circuit 51 are implemented in a firmware form. For example, the memory management circuit 51 is provided with a microprocessor unit (not shown) and read only memory (not shown), and the control instructions are programmed into the read only memory. During operation of the memory storage device 10, the control instructions are executed by the microprocessor unit to perform operations such as writing, reading, and erasing data.

In an exemplary embodiment, the control instructions of the memory management circuit 51 may also be stored in a specific area (e.g., a system region dedicated to storing system data in the memory module) of the rewritable non-volatile memory module 43. In addition, the memory management circuit 51 is provided with a microprocessor unit (not shown), read only memory (not shown), and random access memory (not shown). In particular, there exists a boot code in the read only memory. When the memory control circuit unit 42 is enabled, the microprocessor unit first executes the boot code to load the control instructions stored in the rewritable non-volatile memory module 43 into the random access memory of the memory management circuit 51. After that, the microprocessor unit operates the control instructions to perform operations such as writing, reading, and erasing data.

In an exemplary embodiment, the control instructions of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage a memory cell or a memory cell group of the rewritable non-volatile memory module 43. The memory write circuit is configured to issue a write command sequence to the rewritable non-volatile memory module 43 to write data into the rewritable non-volatile memory module 43. The memory read circuit is configured to issue a read instruction sequence to the rewritable non-volatile memory module 43 to read data from the rewritable non-volatile memory module 43. The memory erase circuit is configured to issue an erase instruction sequence to the rewritable non-volatile memory module 43 to erase data from the rewritable non-volatile memory module 43. The data processing circuit is configured to process data to be written to the rewritable non-volatile memory module 43 and data read from the rewritable non-volatile memory module 43. The write command sequence, the read instruction sequence, and the erase instruction sequence may each include one or more programming codes or instruction codes and are configured to instruct the rewritable non-volatile memory module 43 to perform corresponding write, read, and erase operations among other operations. In an exemplary embodiment, the memory management circuit 51 may also issue other types of instruction sequences to the rewritable non-volatile memory module 43 to instruct the rewritable non-volatile memory module 43 to perform corresponding operations.

The host interface 52 is coupled to the memory management circuit 51. The memory management circuit 51 may communicate with the host system 11 through the host interface 52. The host interface 52 may be configured to receive and identify instructions and data transmitted by the host system 11. For example, the instructions and data transmitted by the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the disclosure is not limited thereto. The host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard or other suitable data transmission standard.

The memory interface 53 is coupled to the memory management circuit 51 and configured to access the rewritable non-volatile memory module 43. For example, the memory management circuit 51 may access the rewritable non-volatile memory module 43 through the memory interface 53. In other words, data to be written into the rewritable non-volatile memory module 43 is converted through the memory interface 53 into a format acceptable by the rewritable non-volatile memory module 43. Specifically, when the memory management circuit 51 is to access the rewritable non-volatile memory module 43, the memory interface 53 will transmit corresponding instruction sequences. For example, the instruction sequences may include a write command sequence commanding data be written, a read instruction sequence commanding data be read, an erase instruction sequence indicating data be erased, and corresponding instruction sequences commanding various memory operations (e.g., changing the read voltage level or performing a garbage collection operation, etc.). The instruction sequences are, for example, generated by the memory management circuit 51 and transmitted through the memory interface 53 to the rewritable non-volatile memory module 43. The instruction sequences may include one or more signals, or data on a bus. The signals or data may include instruction codes or programming codes. For example, in the read instruction sequence, information such as a read identification code or a memory address is included.

In an exemplary embodiment, the memory control circuit unit 42 further includes an error detection and correction circuit 54, a buffer memory 55, and a power management circuit 56.

The error detection and correction circuit 54 is coupled to the memory management circuit 51 and configured to perform error detection and correction operations to ensure data correctness. Specifically, when the memory management circuit 51 receives a write command from the host system 11, the error detection and correction circuit 54 generates a corresponding error correcting code (ECC) and/or error detecting code (EDC) for data corresponding to the write command. In addition, the memory management circuit 51 writes the data corresponding to the write command and the corresponding error correcting code and/or error detecting code into the rewritable non-volatile memory module 43. Later, while reading data from the rewritable non-volatile memory module 43, the memory management circuit 51 also reads the error correcting code and/or error detecting code corresponding to the data. Moreover, the error detection and correction circuit 54 performs error detection and correction operations on the read data according to the error correcting code and/or error detecting code.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 in FIG. 4 may include a flash memory module. In an exemplary embodiment, the memory control circuit unit 42 may include a flash memory controller. In an exemplary embodiment, the memory management circuit 51 in FIG. 5 may include a flash memory management circuit.

Figure 6:
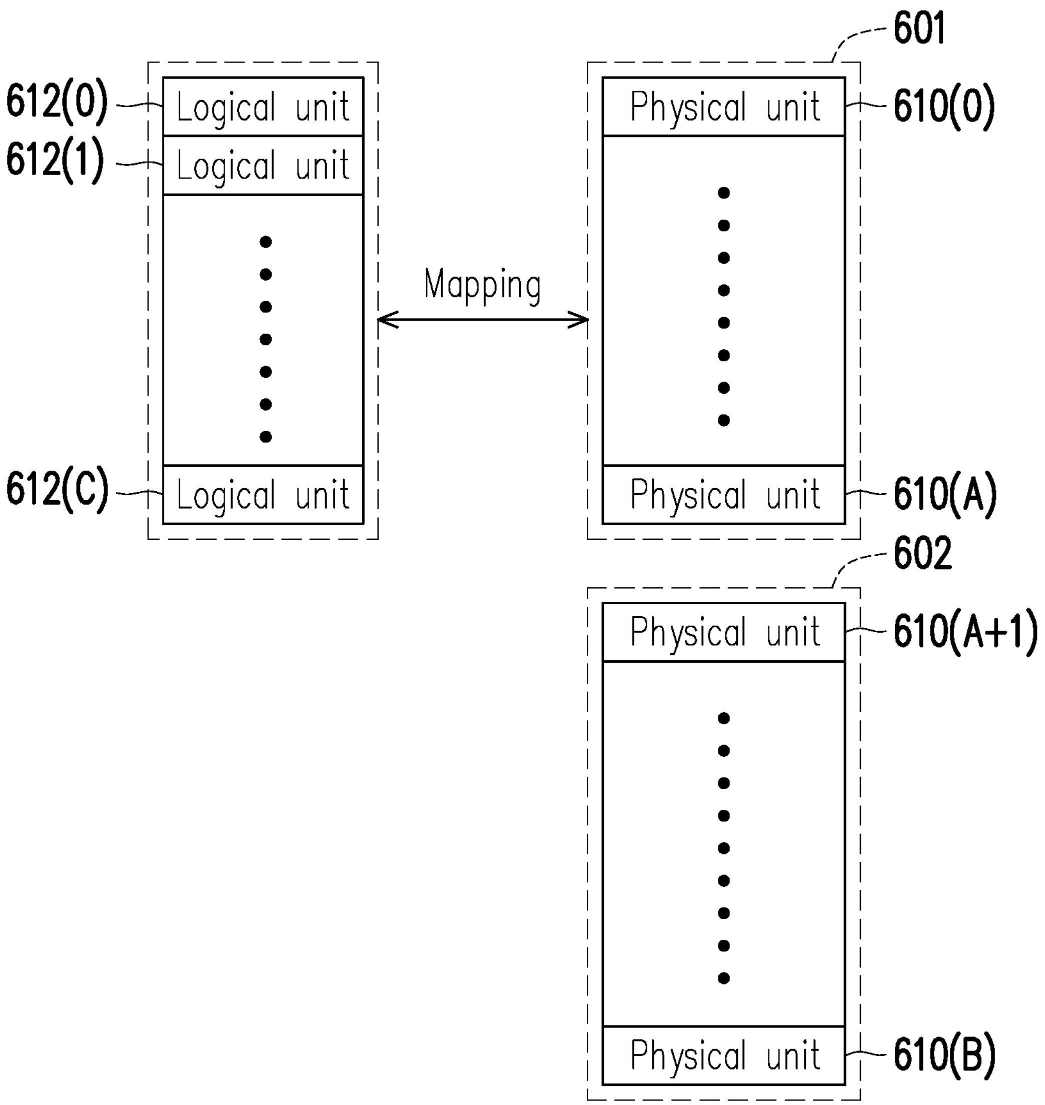
FIG. 6 is a schematic diagram showing management of a rewritable non-volatile memory module according to an exemplary embodiment of the disclosure.

FIG. 6 is a schematic diagram showing management of a rewritable non-volatile memory module according to an exemplary embodiment of the disclosure. With reference to FIG. 6, the memory management circuit 51 may logically group physical units 610(0) to 610(C) in the rewritable non-volatile memory module 43 into a storage region 601 and a spare region 602.

In an exemplary embodiment, one physical unit includes one or more physical blocks. One physical unit may includes a plurality of physical nodes. In an exemplary embodiment, each physical node may store data with a data length of 4 KB. In an exemplary embodiment, each physical node may also store more or less data, which is not limited by the disclosure.

The physical units 610(0) to 610(A) in the storage region 601 are configured to store user data (e.g., user data from the host system 11 in FIG. 1). For example, the physical units 610(0) to 610(A) in the storage region 601 may store valid data and invalid data. The physical units 610(A+1) to 610(B) in the spare region 602 do not store data (e.g., valid data). For example, if a certain physical unit does not store valid data, this physical unit may be associated with (or added to) the spare region 602. In addition, the physical unit in the spare region 602 (or the physical unit that does not store valid data) may be erased. When new data is written, one or more physical units may be retrieved from the spare region 602 to store the new data. In an exemplary embodiment, the spare region 602 is also referred to as a free pool.

The memory management circuit 51 may be provided with logical units 612(0) to 612(C) to be mapped to the physical units 610(0) to 610(A) in the storage region 601. In an exemplary embodiment, each logical unit corresponds to one logical address. For example, one logical address may include one or more logical block addresses (LBA) or other logical management units. In an exemplary embodiment, one logical unit may also correspond to one logical programming unit or may be formed by a plurality of continuous or discontinuous logical addresses.

Note that one logical unit may be mapped to one or more physical units. If a certain physical unit is currently mapped to a certain logical unit, it means that data currently stored in this physical unit includes valid data. Comparatively, if a certain physical unit is currently not mapped to any logical unit, it means that data currently stored in this physical unit is invalid data.

The memory management circuit 51 may record mapping information (also referred to as logical-to-physical mapping information) describing the mapping relationship between logical units and physical units in at least one mapping table (also referred to as a logical-to-physical mapping table). When the host system 11 is to read data from the memory storage device 10 or write data into the memory storage device 10, the memory management circuit 51 may access the rewritable non-volatile memory module 43 according to the information (i.e., mapping information) in the mapping table.

Figure 7:
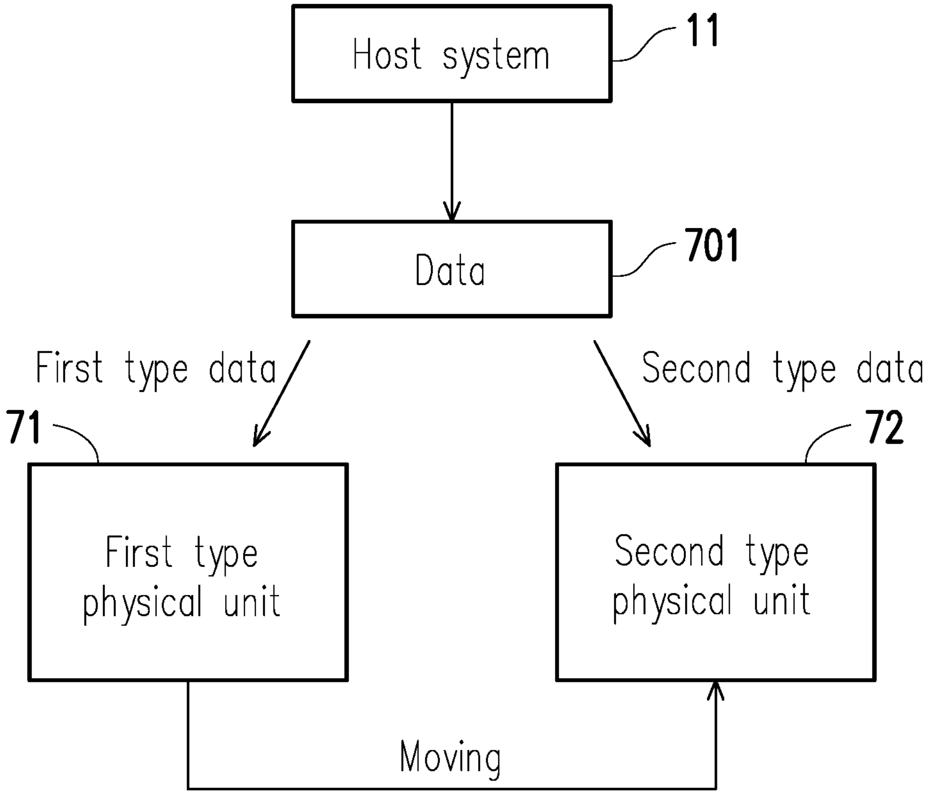
FIG. 7 is a schematic diagram showing write data according to an exemplary embodiment of the disclosure.

FIG. 7 is a schematic diagram showing write data according to an exemplary embodiment of the disclosure. With reference to FIG. 7, the memory management circuit 51 may receive at least one write command from the host system 11. The write command instructs storing of data (also referred to as first data) 701 belonging to a specific logical unit (also referred to as a first logical unit). The memory management circuit 51 may determine whether the data 701 is first type data or second type data according to the write command.

In an exemplary embodiment, in response to the data 701 being first type data, the memory management circuit 51 may instruct the rewritable non-volatile memory module 43 to store the data 701 in a first type physical unit 71 according to the write command. For example, the memory management circuit 51 may retrieve at least one physical unit from the spare region 602 in FIG. 6 as the first type physical unit 71. The total number of first type physical units 71 may be one or plural.

On the other hand, in response to the data 701 being first type data, the memory management circuit 51 may also update count information (also referred to as first count information) corresponding to a specific logical range (also referred to as a first logical range). In particular, the first logical unit belongs to the first logical range. For example, assuming that the first logical unit corresponds to a logical block address LBA(20), then the first logical range may cover logical block addresses LBA(0) to LBA(1023). The size of each logical range may be adjusted depending on practical requirements.

After storing the data 701 in the first type physical unit 71 and updating the first count information, the memory management circuit 51 may determine whether the first count information meets a preset condition. In response to the first count information meeting the preset condition, the memory management circuit 51 may instruct the rewritable non-volatile memory module 43 to move the data 701 from the first type physical unit 71 to a second type physical unit 72. For example, the memory management circuit 51 may retrieve at least one physical unit from the spare region 602 in FIG. 6 as the second type physical unit 72. The total number of second type physical units 72 may also be one or plural.

In an exemplary embodiment, in response to the data 701 being second type data, the memory management circuit 51 may instruct the rewritable non-volatile memory module 43 to store the data 701 in the second type physical unit 72 according to the write command. In other words, in the case where the data 701 is second type data, the data 701 may be directly stored in the second type physical unit 72 instead of being first stored in the first type physical unit 71 and then moved to the second type physical unit 72. From another point of view, according to whether the data 701 is first type data or second type data, the data 701 may be directly stored in one of the first type physical unit 71 and the second type physical unit 72.

In an exemplary embodiment, the memory management circuit 51 may determine whether the data 701 belongs to first type data or second type data according to a data amount of the data 701. For example, the memory management circuit 51 may determine whether the data amount of the data 701 is less than a critical data amount. In response to the data amount of the data 701 being less than the critical data amount, the memory management circuit 51 may determine that the data 701 belongs to first type data. Alternatively, in response to the data amount of the data 701 being not less than (i.e., greater than or equal to) the critical data amount, the memory management circuit 51 may determine that the data 701 belongs to second type data. The critical data amount may be set depending on practical requirements, and is not limited by the disclosure.

In an exemplary embodiment, the first type physical unit 71 may be dedicated to storing data whose data amount is less than the critical data amount, and the second type physical unit 72 may be dedicated to storing data whose data amount is not less than the critical data amount. Accordingly, regardless of the data amount of the data 701 currently received from the host system 11, the data 701 may be stored in the corresponding type of physical unit in an appropriate manner, accordingly improving storage efficiency of the data 701.

In an exemplary embodiment, the first count information includes a count value. The memory management circuit 51 may determine whether the first count information meets a preset condition according to the count value. For example, the memory management circuit 51 may determine whether the count value reaches a critical value. In response to the count value reaching the critical value, the memory management circuit 51 may determine that the first count information meets the preset condition. Alternatively, in response to the count value not reaching the critical value, the memory management circuit 51 may determine that the first count information does not meet the preset condition.

In an exemplary embodiment, the first count information (or the count value) may reflect how much data belonging to the first logical range has currently been stored in the first type physical unit 71. In an exemplary embodiment, if the count value reaches the critical value, it means that at least part of the data belonging to the first logical range has currently been stored in the first type physical unit 71. As a result, in response to the count value reaching the critical value (i.e., the first count information meeting the preset condition), the memory management circuit 51 may instruct the rewritable non-volatile memory module 43 to move the data (including the first data) originally scatteredly stored in the first type physical unit 71 and belonging to the first logical range to the second type physical unit 72 for continuous and/or centralized storage. Accordingly, subsequent management efficiency of data belonging to the first logical range may be effectively improved. Nonetheless, if the count value does not reach the critical value (i.e., the first count information does not meet the preset condition), it is possible to temporarily not move the data belonging to the first logical range (i.e., retain the first data in the first type physical unit 71).

In an exemplary embodiment, in response to the first count information meeting the preset condition, the memory management circuit 51 may move the data 701 together with another data (also referred to as second data) in the first type physical unit 71 to the second type physical unit 72. In particular, the second data belongs to a specific logical unit (also referred to as a second logical unit), and the second logical unit also belongs to the first logical range. In addition, after the first data and the second data are moved to the second type physical unit 72, the first data and the second data still stored in the first type physical unit 71 may be labeled as invalid data.

Figure 8:
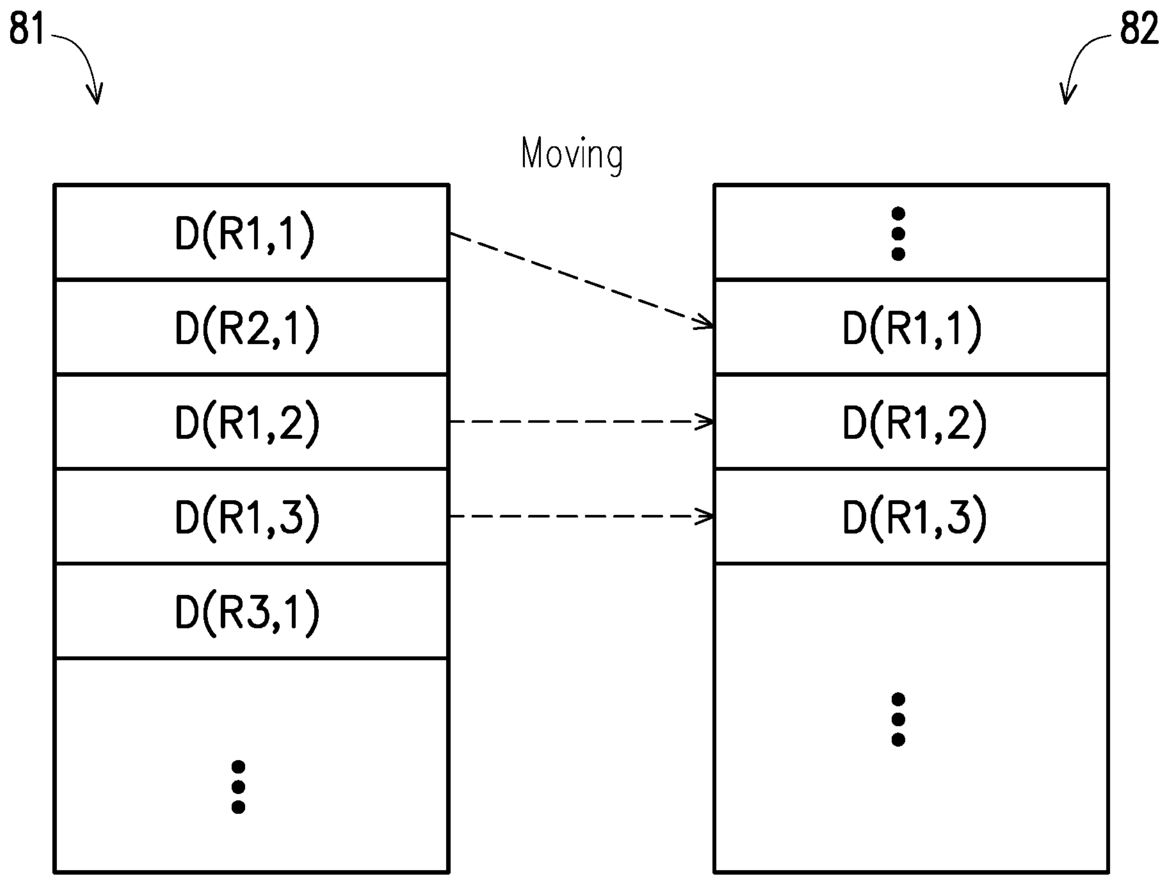
FIG. 8 is a schematic diagram showing movement of multiple pieces of data belonging to a first logical range from a first type physical unit to a second type physical unit according to an exemplary embodiment of the disclosure.

FIG. 8 is a schematic diagram showing movement of multiple pieces of data belonging to a first logical range from a first type physical unit to a second type physical unit according to an exemplary embodiment of the disclosure. With reference to FIG. 8, it is assumed that data D(R1.1), D(R2.1), D(R1.2), D(R1.3), and D(R3.1) are continuously stored in a first type physical unit 81. The logical units to which the data D(R1.1), D(R1.2), and D(R1.3) belong are continuous and included in a first logical range (labeled as R1). The logical unit to which the data D(R2.1) belongs is included in a second logical range (labeled as R2). The logical unit to which the data D(R3.1) belongs is included in a third logical range (labeled as R3).

Note that, in the first type physical unit 81, the data D(R1.1), D(R1.2), and D(R1.3) are scatteredly stored in a plurality of discontinuous entity sub-units (e.g., physical pages, physical sectors, or physical nodes). In this case, the storage (i.e., discontinuous storage) of the data D(R1.1), D(R1.2), and D(R1.3) in the first type physical unit 81 is not beneficial to continuous reading of the data D(R1.1), D(R1.2), and D(R1.3).

In an exemplary embodiment, in response to the count information corresponding to the first logical range (i.e., the first count information) meeting the preset condition, the data D(R1.1), D(R1.2), and D(R1.3) may be moved from the first type physical unit 81 to a second type physical unit 82 for continuous and/or centralized storage. For example, in the second type physical unit 82, the data D(R1.1), D(R1.2), and D(R1.3) may be stored in a plurality of continuous entity sub-units (e.g., physical pages, physical sectors, or physical nodes). In particular, the storage (i.e., continuous storage) of the data D(R1.1), D(R1.2), and D(R1.3) in the second type physical unit 82 is beneficial to subsequent continuous reading of the data D(R1.1), D(R1.2), and D(R1.3). In addition, after the data D(R1.1), D(R1.2), and D(R1.3) are moved to the second type physical unit 82, the data D(R1.1), D(R1.2), and D(R1.3) still stored in the first type physical unit 81 may be labeled as invalid data.

In an exemplary embodiment, the memory management circuit 51 may store count information corresponding to a plurality of logical ranges in one or more count tables. Afterward, the memory management circuit 51 may dynamically update the count information according to the data storage conditions corresponding to these logical ranges.

FIG. 9 is a schematic diagram showing a count table according to an exemplary embodiment of the disclosure. With reference to FIG. 9, in an exemplary embodiment, the memory management circuit 51 may establish a count table 91. The memory management circuit 51 may generate corresponding index values according to different logical ranges. One index value corresponds to one logical range. Then, the memory management circuit 51 may record the index value and the count value (i.e., the count information) corresponding to one or more logical ranges in the count table 91. For example, an index value R1 and a count value C1 correspond to a first logical range, an index value R2 and a count value C2 correspond to a second logical range, and so on and so forth.

In an exemplary embodiment, the memory management circuit 51 may dynamically update the information in the count table 91 according to the current data writing conditions. For example, in response to the first type data that belongs to the first logical range being stored in the first type physical unit, the count value C1 (i.e., the first count information) corresponding to the first logical range may be updated to reflect the latest data storage conditions of the first logical range.

In an exemplary embodiment, after moving the data 701 from the first type physical unit 71 to the second type physical unit 72, the memory management circuit 51 may clear or reset the first count information. In addition, the memory management circuit 51 may also adopt various table management and optimization techniques such as competition and/or coding to improve efficiency of recording information in the count table 91, which will not be repeatedly described here.

In an exemplary embodiment, during or after moving the data 701 from the first type physical unit 71 to the second type physical unit 72, the memory management circuit 51 may detect abnormal power failure of the memory storage device 10. In response to the abnormal power failure, after the memory storage device 10 is powered on again, the memory management circuit 51 may reconstruct management data corresponding to the first type physical unit 71 (also referred to as first management data) and management data corresponding to the second type physical unit 72 (also referred to as second management data). For example, the first management data includes a timestamp corresponding to the data 701 being written into the first type physical unit 71, and/or the second management data includes a timestamp corresponding to the data 701 being written into the second type physical unit 72. Then, the memory management circuit 51 may determine whether the data 701 in the first type physical unit 71 is valid data according to the first management data and the second management data.

Figure 10:
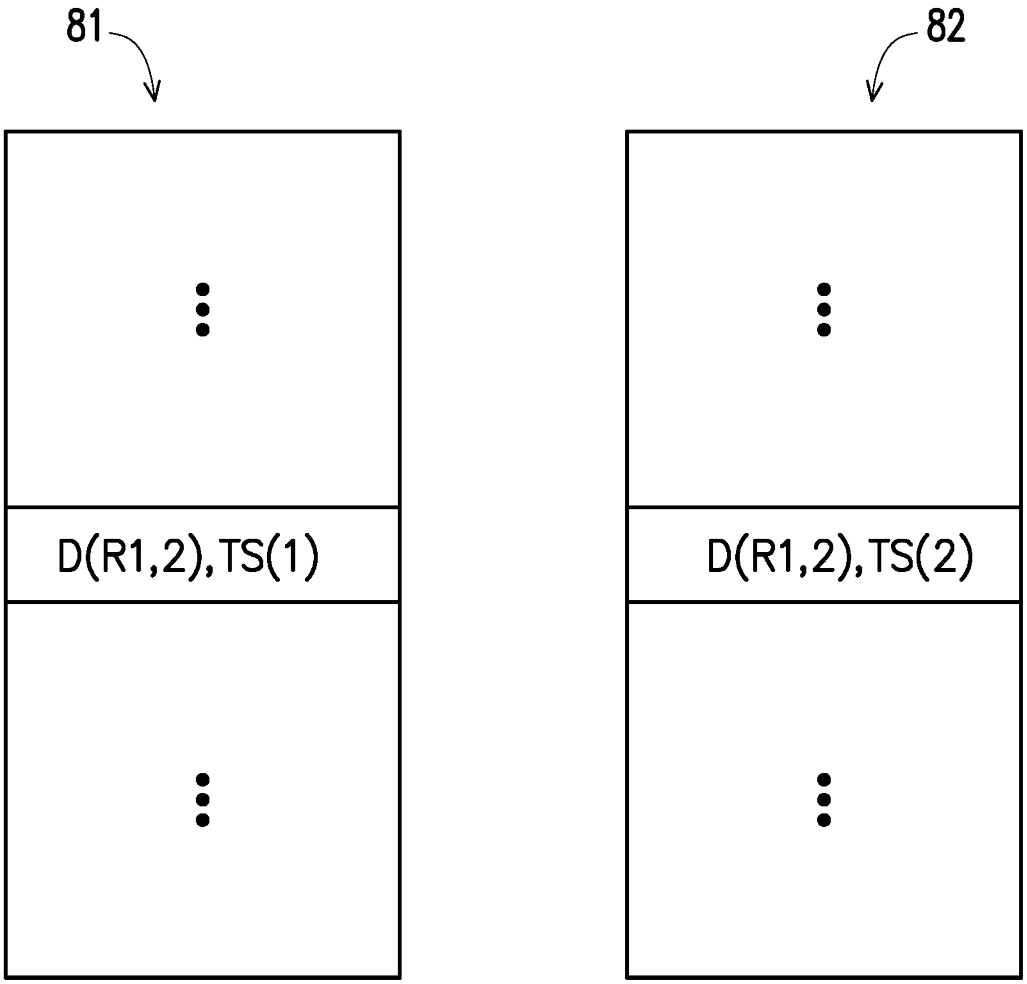
FIG. 10 is a schematic diagram showing reconstruction of first management data and second management data according to an exemplary embodiment of the disclosure.

FIG. 10 is a schematic diagram showing reconstruction of first management data and second management data according to an exemplary embodiment of the disclosure. With reference to FIG. 10, following the exemplary embodiment of FIG. 8, when the data D(R1.2) is stored in the first type physical unit 81, the memory management circuit 51 may store a timestamp TS(1) in the first type physical unit 81 along with the data D(R1.2). Alternatively, the memory management circuit 51 may also store the timestamp TS(1) in management data corresponding to the first type physical unit 81. The timestamp TS(1) may reflect the time point when the data D(R1.2) is stored in the first type physical unit 81. In addition, when the data D(R1.2) is stored in the second type physical unit 82, the memory management circuit 51 may store a timestamp TS(2) in the second type physical unit 82 along with the data D(R1.2). Alternatively, the memory management circuit 51 may also store the timestamp TS(2) in management data corresponding to the second type physical unit 82. The timestamp TS(2) may reflect the time point when the data D(R1.2) is stored in the second type physical unit 82.

In an exemplary embodiment, it is assumed that abnormal power failure of the memory storage device 10 occurs during or after moving the data D(R1.2). After the memory storage device 10 is powered on again, in response to the abnormal power failure, the memory management circuit 51 may reconstruct the management data corresponding to the first type physical unit 81 (i.e., the first management data) and the management data corresponding to the first type physical unit 82 (i.e., the second management data). For example, the first management data may include the timestamp TS(1) corresponding to the data D(R1.2), and the second management data may include the timestamp TS(2) corresponding to the data D(R1.2).

In an exemplary embodiment, the memory management circuit 51 may determine whether the data D(R1.2) in the first type physical unit 81 is valid data according to the timestamps TS(1) and TS(2) in the reconstructed management data. For example, in response to the value of the timestamp TS(2) being greater than the value of TS(1), it means that the time point when the data D(R1.2) is stored in the second type physical unit 82 is later than the time point when the data D(R1.2) is stored in the first type physical unit time point of 81. As a result, the memory management circuit 51 may determine that data movement of the data D(R1.2) has been completed previously and the data D(R1.2) in the first type physical unit 81 is invalid data.

On the other hand, if the value of the timestamp TS(2) is not greater than the value of TS(1) or the timestamp TS(2) is not present in the second management data, it means that previous data movement of the data D(R1.2) has not been completed or has failed. As a result, the memory management circuit 51 may determine that the data D(R1.2) in the first type physical unit 81 is still valid data. Accordingly, regardless of whether abnormal power failure occurs or not, the memory management circuit 51 may manage the data (i.e., valid data) in the first type physical unit 81 normally. In addition, once the data (i.e., valid data) in the first type physical unit 81 have been moved to the second type physical unit 82, the first type physical unit 81 may be associated with the spare region 602 in FIG. 6 and may be erased.

Figure 11:
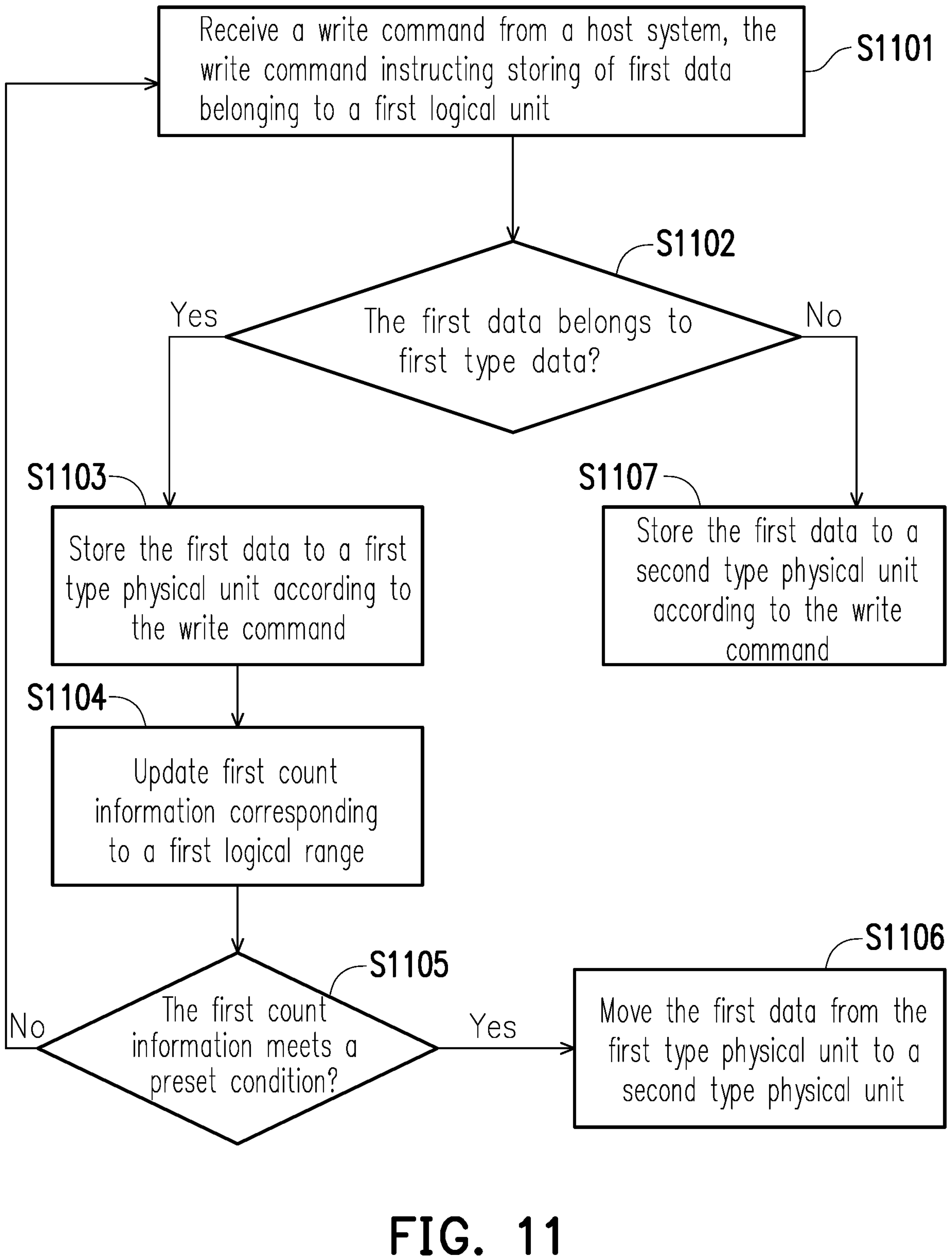
FIG. 11 is a flowchart of a data writing method according to an exemplary embodiment of the disclosure.

FIG. 11 is a flowchart of a data writing method according to an exemplary embodiment of the disclosure. With reference to FIG. 11, in step S1101, a write command is received from a host system. The write command instructs storing of first data belonging to a first logical unit. In step S1102, it is determined whether the first data belongs to first type data. If the first data belongs to first type data, in step S1103, the first data is stored in a first type physical unit according to the write command. In step S1104, first count information corresponding to a first logical range is updated. The first logical unit belongs to the first logical range.

In step S1105, it is determined whether the first count information meets a preset condition. If the first count information meets the preset condition, in step S1106, the first data is moved from the first type physical unit to a second type physical unit. Comparatively, if the first count information does not meet the preset condition, step S1101 may be performed repeatedly to subsequently process the next command (e.g., the write command) from the host system. On the other hand, in step S1102, if it is determined that the first data does not belong to first type data (for example, the first data belongs to second type data), in step S1107, the first data is stored in a second type physical unit according to the write command.

Nonetheless, the steps in FIG. 11 have been described in detail as above, and will not be repeatedly described here. It is worth noting that the steps in FIG. 11 may be practiced into a plurality of programming codes or circuits, which is not limited by the disclosure. In addition, the method in FIG. 11 may be used with the exemplary embodiments above, or may be used alone, which is not limited by the disclosure.

In summary of the foregoing, the data writing method, the memory storage device, and the memory control circuit unit proposed by the exemplary embodiments of the disclosure may ensure continuity of data belonging to the same logical range in the physical storage space by performing subsequent data moving and merging on the premise of satisfying predetermined data split storage. Accordingly, data writing efficiency and writing continuity may be achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data writing method for a rewritable non-volatile memory module, wherein the rewritable non-volatile memory module comprises a plurality of physical units, and the data writing method comprises:

receiving a write command from a host system, wherein the write command instructs storing of first data belonging to a first logical unit, and the first logical unit belongs to a first logical range;

in response to the first data being first type data, storing the first data in a first type physical unit, which is also configured to store second data belonging to the first logical range and third data belonging to a second logical range different from the first logical range, among the plurality of physical units according to the write command, such that the first type physical unit stores the first data and the second data both belonging to the first logical range and the third data belonging to the second logical range at the same time, wherein, in the first type physical unit, the third data is interspersed between the first data and the second data;

updating first count information corresponding to the first logical range, wherein the first count information comprises a count value, and the count value is updated based on amount of data belonging to only the first logical range and currently stored in the first type physical unit, rather than all or any data stored in the first type physical unit; and in response to the first count information meeting a preset condition, only moving the first data and the second data both belonging to the first logical range from the first type physical unit to a second type physical unit among the plurality of physical units, and keeping the third data interspersed between the first data and the second data in the first type physical unit, wherein, in the second type physical unit, the first data and the second data are continuously arranged, the first type physical unit is dedicated to storing data whose data amount is less than a critical data amount, and the second type physical unit is dedicated to storing data whose data amount is not less than the critical data amount.

2. The data writing method according to claim 1, further comprising:

in response to the first data being second type data, storing the first data in the second type physical unit according to the write command.

3. The data writing method according to claim 1, further comprising:

determining whether the first data belongs to the first type data or second type data according to a data amount of the first data.

4. The data writing method according to claim 1, the data writing method further comprises:

determining whether the first count information meets the preset condition according to whether the count value reaches a critical value.

5. The data writing method according to claim 1, wherein moving the first data and the second data from the first type physical unit to the second type physical unit comprises:

moving the first data together with the second data in the first type physical unit to the second type physical unit, wherein the second data belongs to a second logical unit, and the second logical unit also belongs to the first logical range.

6. The data writing method according to claim 1, further comprising:

clearing or resetting the first count information after moving the first data from the first type physical unit to the second type physical unit.

7. The data writing method according to claim 1, further comprising:

detecting abnormal power failure during or after moving the first data from the first type physical unit to the second type physical unit;

in response to the abnormal power failure, reconstructing first management data corresponding to the first type physical unit and second management data corresponding to the second type physical unit; and determining whether the first data in the first type physical unit is valid data according to the first management data and the second management data.

8. A memory storage device comprising:

a connection interface unit for coupling to a host system;

a rewritable non-volatile memory module, wherein the rewritable non-volatile memory module comprises a plurality of physical units; and a memory control circuit unit coupled to the connection interface unit and the rewritable non-volatile memory module, wherein the memory control circuit unit is configured to:

receive a write command from the host system, wherein the write command instructs storing of first data belonging to a first logical unit, and the first logical unit belongs to a first logical range;

in response to the first data being first type data, store the first data in a first type physical unit, which is also configured to store second data belonging to the first logical range and third data belonging to a second logical range different from the first logical range, among the plurality of physical units according to the write command, such that the first type physical unit stores the first data and the second data both belonging to the first logical range and the third data belonging to the second logical range at the same time, wherein, in the first type physical unit, the third data is interspersed between the first data and the second data;

update first count information corresponding to the first logical range, wherein the first count information comprises a count value, and the count value is updated based on amount of data belonging to only the first logical range and currently stored in the first type physical unit, rather than all or any data stored in the first type physical unit; and in response to the first count information meeting a preset condition, only move the first data and the second data both belonging to the first logical range from the first type physical unit to a second type physical unit among the plurality of physical units, and keep the third data interspersed between the first data and the second data in the first type physical unit, wherein, in the second type physical unit, the first data and the second data are continuously arranged, the first type physical unit is dedicated to storing data whose data amount is less than a critical data amount, and the second type physical unit is dedicated to storing data whose data amount is not less than the critical data amount.

9. The memory storage device according to claim 8, wherein the memory control circuit unit is further configured to:

in response to the first data being second type data, store the first data in the second type physical unit according to the write command.

10. The memory storage device according to claim 8, wherein the memory control circuit unit is further configured to:

determine whether the first data belongs to the first type data or second type data according to a data amount of the first data.

11. The memory storage device according to claim 8, the memory control circuit unit is further configured to:

determine whether the first count information meets the preset condition according to whether the count value reaches a critical value.

12. The memory storage device according to claim 8, wherein the operation of the memory control circuit unit moving the first data and the second data from the first type physical unit to the second type physical unit comprises:

moving the first data together with the second data in the first type physical unit to the second type physical unit, wherein the second data belongs to a second logical unit, and the second logical unit also belongs to the first logical range.

13. The memory storage device according to claim 8, wherein the memory control circuit unit is further configured to:

clear or reset the first count information after moving the first data from the first type physical unit to the second type physical unit.

14. The memory storage device according to claim 8, wherein the memory control circuit unit is further configured to:

detect abnormal power failure during or after moving the first data from the first type physical unit to the second type physical unit;

in response to the abnormal power failure, reconstruct first management data corresponding to the first type physical unit and second management data corresponding to the second type physical unit; and determine whether the first data in the first type physical unit is valid data according to the first management data and the second management data.

15. A memory control circuit unit for controlling a rewritable non-volatile memory module, wherein the rewritable non-volatile memory module comprises a plurality of physical units, and the memory control circuit unit comprises:

a host interface for coupling to a host system;

a memory interface for coupling to the rewritable non-volatile memory module; and a memory management circuit coupled to the host interface and the memory interface, wherein the memory management circuit is configured to:

receive a write command from the host system, wherein the write command instructs storing of first data belonging to a first logical unit, and the first logical unit belongs to a first logical range;

in response to the first data being first type data, store the first data in a first type physical unit, which is also configured to store second data belonging to the first logical range and third data belonging to a second logical range different from the first logical range, among the plurality of physical units according to the write command, such that the first type physical unit stores the first data and the second data both belonging to the first logical range and the third data belonging to the second logical range at the same time, wherein, in the first type physical unit, the third data is interspersed between the first data and the second data;

update first count information corresponding to the first logical range, wherein the first count information comprises a count value, and the count value is updated based on amount of data belonging to only the first logical range and currently stored in the first type physical unit, rather than all or any data stored in the first type physical unit; and in response to the first count information meeting a preset condition, only move the first data and the second data both belonging to the first logical range from the first type physical unit to a second type physical unit among the plurality of physical units, and keep the third data interspersed between the first data and the second data in the first type physical unit, wherein, in the second type physical unit, the first data and the second data are continuously arranged, the first type physical unit is dedicated to storing data whose data amount is less than a critical data amount, and the second type physical unit is dedicated to storing data whose data amount is not less than the critical data amount.

16. The memory control circuit unit according to claim 15, wherein the memory management circuit is further configured to:

in response to the first data being second type data, store the first data in the second type physical unit according to the write command.

17. The memory control circuit unit according to claim 15, wherein the memory management circuit is further configured to:

determine whether the first data belongs to the first type data or second type data according to a data amount of the first data.

18. The memory control circuit unit according to claim 15, the memory management circuit is further configured to:

determine whether the first count information meets the preset condition according to whether the count value reaches a critical value.

19. The memory control circuit unit according to claim 15, wherein the operation of the memory management circuit moving the first data and the second data from the first type physical unit to the second type physical unit comprises:

moving the first data together with the second data in the first type physical unit to the second type physical unit, wherein the second data belongs to a second logical unit, and the second logical unit also belongs to the first logical range.

20. The memory control circuit unit according to claim 15, wherein the memory management circuit is further configured to:

clear or reset the first count information after moving the first data from the first type physical unit to the second type physical unit.

21. The memory control circuit unit according to claim 15, wherein the memory management circuit is further configured to:

detect abnormal power failure during or after moving the first data from the first type physical unit to the second type physical unit;

in response to the abnormal power failure, reconstruct first management data corresponding to the first type physical unit and second management data corresponding to the second type physical unit; and determine whether the first data in the first type physical unit is valid data according to the first management data and the second management data.

* * * * *